United States Patent [19]

Anderson et al.

[11] Patent Number: 5,351,462
[45] Date of Patent: Oct. 4, 1994

[54] METHOD AND APPARATUS FOR INSTALLING AN INSERT TO SEAL A CONTAINER

[75] Inventors: Paul A. Anderson, Arlington Heights; Colin Colangelo, McHenry, both of Ill.

[73] Assignee: Automatic Liquid Packaging, Inc., Woodstock, Ill.

[21] Appl. No.: 71,664

[22] Filed: Jun. 2, 1993

[51] Int. Cl.⁵ .................. B65B 61/00; B65B 3/02; B65B 43/00
[52] U.S. Cl. ........................... 53/410; 53/130.1; 53/138.1; 53/140; 53/452; 264/524
[58] Field of Search .............. 264/523, 524, 525; 425/503, 504; 53/128.1, 130.1, 138.1, 140, 410, 416, 452

[56] References Cited

U.S. PATENT DOCUMENTS

| | | | |
|---|---|---|---|
| 3,251,915 | 5/1966 | Pechthold | 264/526 |
| 3,518,803 | 7/1970 | Wunderlich et al. | 53/452 |
| 3,690,088 | 9/1972 | Anderson et al. | 53/452 |
| 3,851,029 | 11/1974 | Cornett, III et al. | 264/525 |
| 3,919,374 | 11/1975 | Komendowski | 53/140 |
| 4,176,153 | 11/1979 | Weiler et al. | 264/524 |
| 4,425,090 | 1/1984 | Hansen | 264/525 |
| 4,596,110 | 6/1986 | Weiler | 53/452 |
| 4,707,966 | 11/1987 | Weiler et al. | 53/452 |
| 4,790,117 | 12/1988 | Hansen | 53/140 |
| 5,031,384 | 7/1991 | Rebeyrolle et al. | 53/452 |

*Primary Examiner*—W. Donald Bray
*Attorney, Agent, or Firm*—Olson & Hierl, Ltd.

[57] ABSTRACT

A method and apparatus are provided for molding a parison of thermoplastic material to form a container with an inwardly extending flange around the container closure. The container body portion is filled with product through an access opening. An insert article serving as the container closure is then positioned within the access opening. The parison is radially compressed inwardly against the insert article to form a bead of thermoplastic material contiguous with the insert article. The bead is then permanently deformed against the insert article axially in the direction of the container body portion. This forms a flange over a portion of the article to retain the insert article on the container while sealing the container.

11 Claims, 6 Drawing Sheets

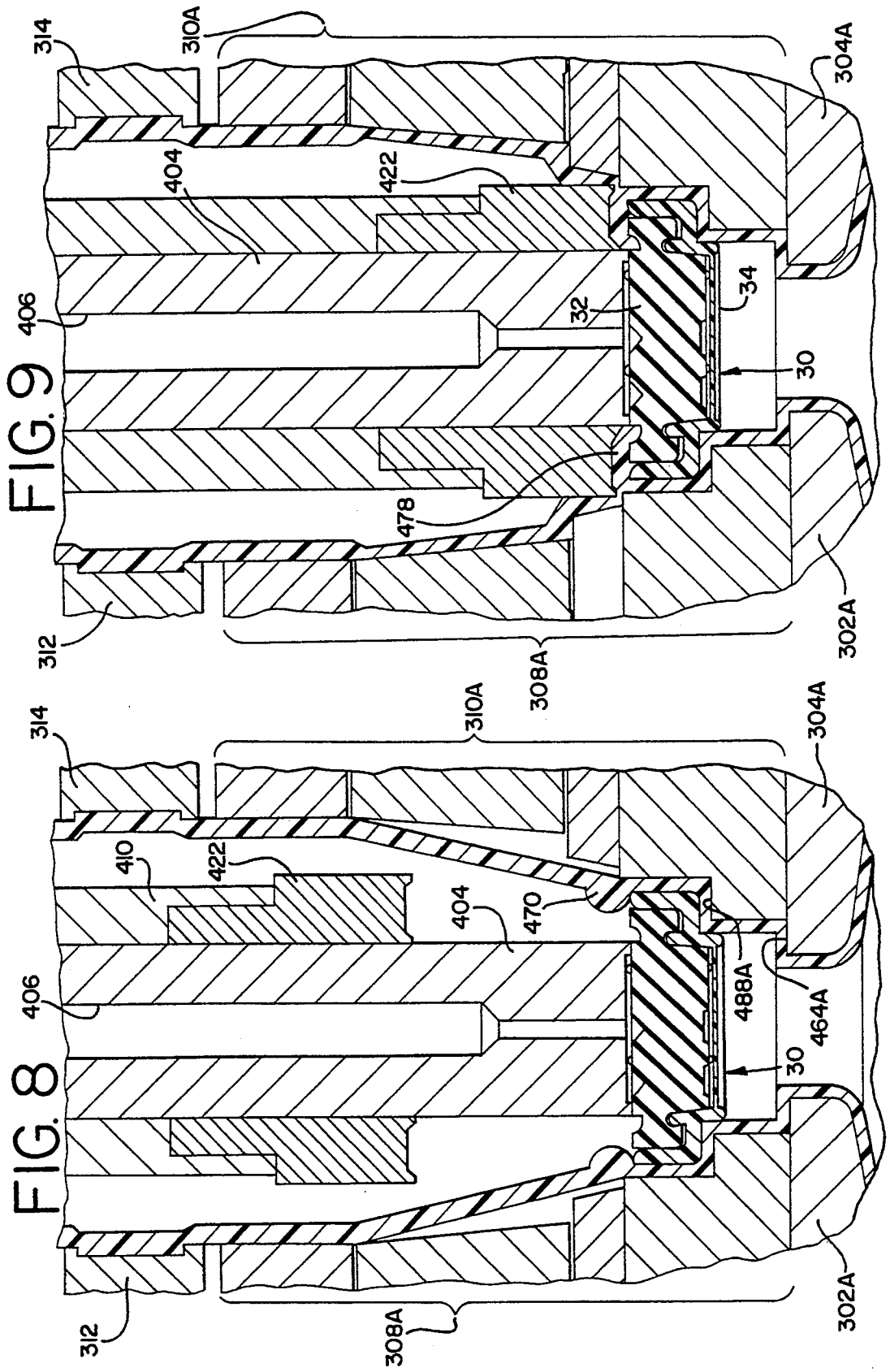

METHOD AND APPARATUS FOR INSTALLING AN INSERT TO SEAL A CONTAINER

TECHNICAL FIELD

The present invention relates to an improved method and apparatus for forming and filling a container and then occluding the container opening with an insert to create a sealed package having a retaining flange surrounding the insert.

BACKGROUND OF THE INVENTION AND TECHNICAL PROBLEMS POSED BY THE PRIOR ART

In one type of conventional liquid container the dispensing opening is sealed with an insert article that includes a rubber stopper. The container is initially molded to provide a dispensing opening, and the container is then filled through the opening with a product. Subsequently, the insert article with the rubber stopper is positioned in the container opening. Thereafter, in a separate operation, a top portion of the container is formed into a rim or flange around the insert article to securely hold the insert article and the stopper in place.

The above-described conventional package is utilized for medical applications to accommodate the dispensing of a liquid medicament through a spike or cannula which pierces the rubber stopper. The package can be inverted to permit gravity discharge. This technique can be employed in a conventional intravenous administration system. The spike or cannula can be withdrawn from the rubber stopper when desired. Because the rubber stopper is retained in the package by a peripheral flange on the container, the pull-out forces applied to the stopper by the spike or cannula do not dislodge the stopper.

Although packages manufactured in accordance with the above-described multi-step process function well for their intended purposes, it would be desirable to provide an improved manufacturing process and apparatus for carrying out the process in a simple, uninterrupted procedure. In particular, it would be advantageous to provide an improved system that can accommodate the manufacture of the package in a single apparatus for blow-molding or vacuum-forming the container from a thermoplastic material, filling the container, inserting the closure, and sealing in the closure in the container.

Further, it would be beneficial if such an improved manufacturing system was operable to produce sealed packages at a relatively high rate. In particular, it would be desirable to provide an improved system for fabricating filled packages sequentially, or for fabricating a plurality of packages simultaneously in each manufacturing cycle.

Finally, it would be desirable to provide an improved manufacturing system which can accommodate a variety of different types of inserts, including composite inserts having multiple components.

The present invention provides a method and apparatus for manufacturing a package which can accommodate designs having the above-discussed benefits and features.

SUMMARY OF THE INVENTION

The present system manufactures in a single continuous operation a sealed, molded container filled with a product and closed with an insert article which is retained by a flange unitary with the container and which flange extends over a portion of the insert article.

The present system provides a flange structure on the container over the insert article which is highly effective in sealing and retaining a pierceable insert article, which may be pierceable, in the container. The improved system readily accommodates different types of insert article designs, including composite insert articles that include a plurality of components having a variety of shapes. This is achieved by squeezing or pressing a thermoplastic parison portion around the insert article so as to form a bead of thermoplastic material around the rim or top edge of the insert article. The formed bead is then flattened into a radially inwardly extending flange in intimate contact with the insert article.

In a method aspect of the invention, a parison of thermoplastic material is molded to form a container body portion while maintaining an access opening thereto. The container body portion is then filled with product, and an insert article is positioned within the access opening. The parison is then compressed radially inwardly against the insert article while forming a bead of thermoplastic material about and contiguous with the insert article. The formed bead is permanently deformed against the insert article axially, in the direction of the container body portion, so as to form a radially inwardly extending flange over a portion of the insert article to retain the insert article on the molded container.

In an apparatus aspect of the invention, a molding means constituted by movable mold parts is provided for converting an extruded parison segment into a container body portion while maintaining an access opening thereto having a predetermined configuration. The apparatus includes a fill means for filling the container body portion with a product as well as positioning means for locating and fixing an insert article within the access opening.

To this end, a radial pressing means in the apparatus compresses the parison segment radially inwardly against the insert article to form a bead of the thermoplastic material contiguous with the insert article, and an axial pressing means permanently deforms the formed bead against the insert article axially in the direction of the container body portion so as to form a flange over a portion of the insert article. The formed flange retains the insert article on the container and can also contribute to the sealing effect, depending upon the contours of the insert article.

Highly efficient blow-molding, filling, and sealing techniques can be effectively employed in the novel method and apparatus of the present invention. The method and apparatus can be employed to manufacture the packages at high production rates and in a manner that provides good sealing integrity and good insert article retention. Further, the improved method and apparatus of the present invention can consistently provide such sealed packages with substantially uniform characteristics.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

FIG. 8 is a view similar to FIG. 5, but on a reduced scale and showing an alternate embodiment wherein the insert article is disposed above the main mold in the seal mold; and FIG. 9 is a view similar to FIG. 6, but illustrating the alternate embodiment of FIG. 8, on a reduced scale and showing the crimp ring in the downwardly extended position.

DESCRIPTION OF THE PREFERRED EMBODIMENTS

This invention provides an effective method which incorporates form, fill, and seal techniques as employed in blow-molding or vacuum-forming apparatus to produce pierceable containers, containers equipped with a dispensing nozzle, or the like liquid-containing packages. The present method and apparatus can be utilized at relatively high production rates to form packages in a consistently uniform manner and with high integrity seals.

While this invention is susceptible of embodiment in many different forms, this specification and the accompanying drawings disclose only some preferred specific forms as examples of the invention. The invention is not intended to be limited to the embodiments so described, however. The scope of the invention is pointed out in the appended claims.

Embodiments of the contemplated apparatus illustrated in the FIGURES show details of mechanical elements that are known in the art and that will be recognized by one skilled in the art as such. The detailed descriptions of such elements are not necessary to an understanding of the invention. Accordingly, such elements are herein presented only to the degree necessary to facilitate an understanding of the novel features of the present invention.

Figure 1:
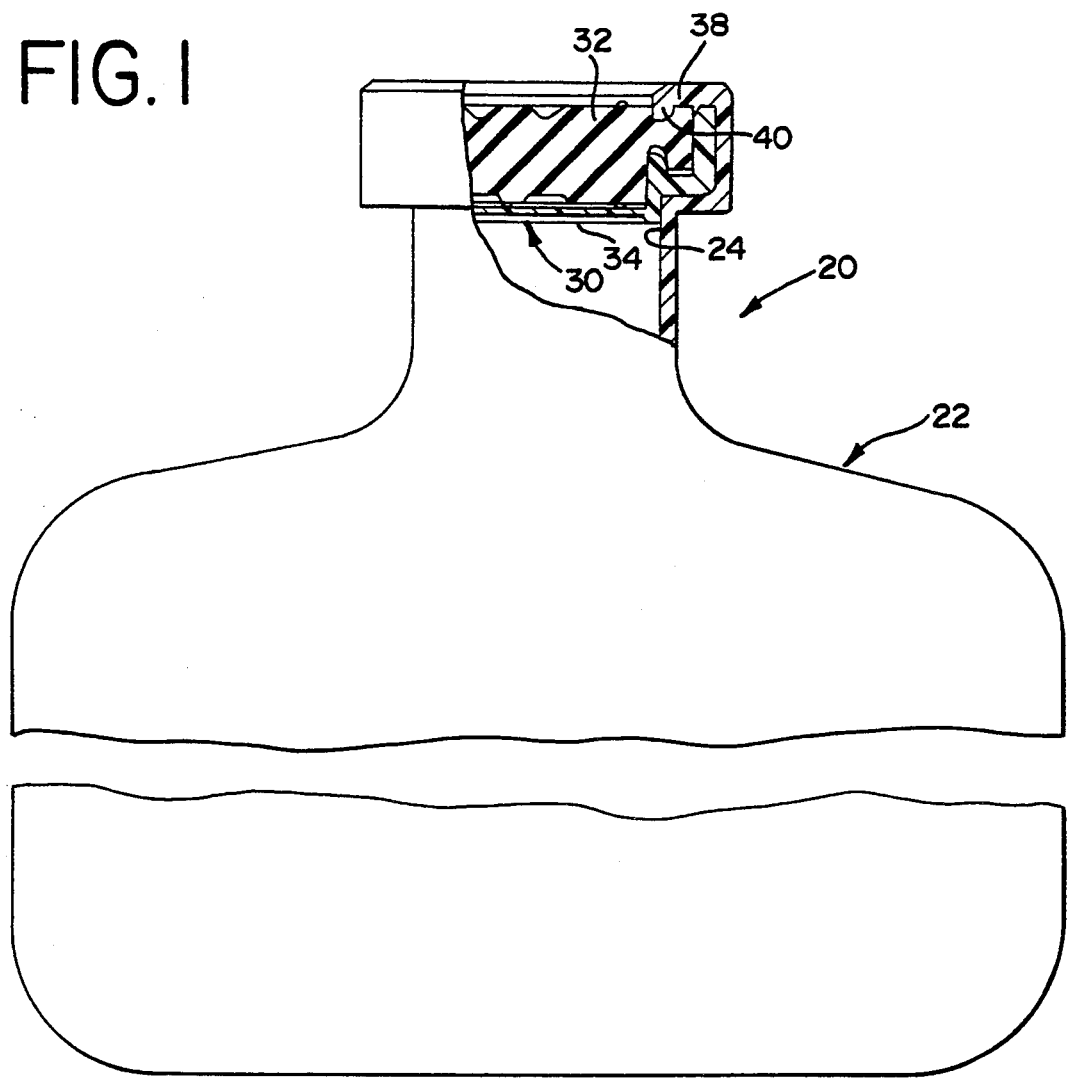
FIG. 1 is a fragmentary, elevational view, partially in cross section, of a package sealed closed with a composite, two-component insert article.

One type of package which can be manufactured in accordance with the present invention is illustrated in FIG. 1 and is designated by the reference numeral 20. Packages of this general type have previously been made by a conventional, less efficient, multi-step manufacturing process.

The package 20 includes a container 22 having a body portion that defines an access opening 24 sealed with an insert article 30. The container 22 is typically molded from a suitable thermoplastic material, such as a high-density polyethylene, low-density polyethylene, polypropylene, or the like. In some medical applications, the container 22 has a flexible wall structure which can be transparent or translucent, as desired. A medicament liquid, such as an intravenous solution or an injectable drug, is sealed within the container 22 by the insert article 30.

The insert article 30 can be a single component article or a multi-component article, such as the two-part article illustrated in FIGS. 1-4. The insert article may have a variety of different shapes. The two-piece insert article illustrated in FIGS. 1-4 is but one example of such shape.

Figure 2:
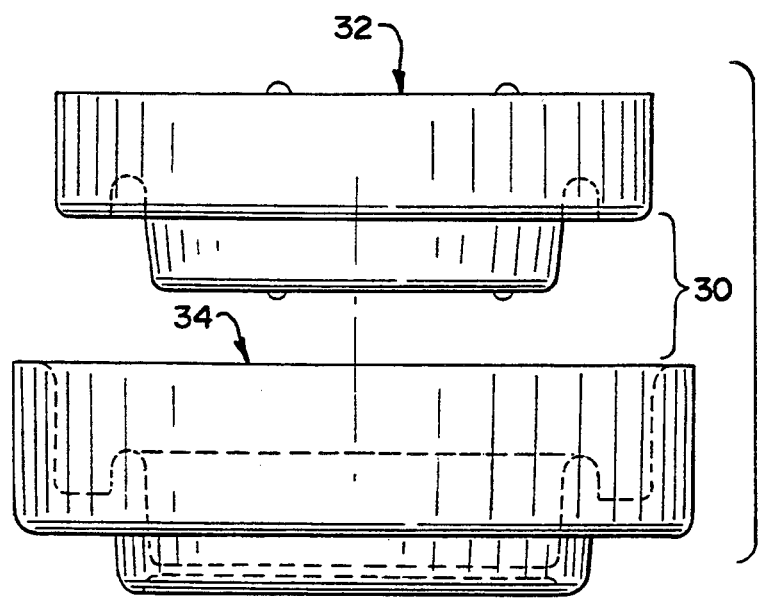
FIG. 2 is a greatly enlarged, side elevation view of the two components that make up the insert article prior to assembly.

As shown in FIG. 2, the insert article 30 includes a pierceable rubber stopper 32 received in a lower cup 34. The cup 34 per se can be molded from a suitable thermoplastic material which is compatible with the material of the container 22 and with the product contained therein. The stopper 32 can have any desired configuration and can be cast or molded from a thermoplastic elastomer in the cup 34 to form an integral insert article 30.

The cup 34 and container 22 are typically fabricated from different thermoplastic materials. Typically, the cup 34 is employed to isolate the container contents from the rubber stopper 32. Also, the thermoplastic material employed for the cup 34 can be selected so as to enhance the hermetic seal formation between the insert article 30 and the container 22.

In some applications, the stopper 32 can be provided alone, without the cup 34, for sealing the container 22. Of course, in such a design the stopper material must be of the type that is not adversely affected by the container contents and that will form an effective hermetic seal with the wall of the container 22.

Figure 3:
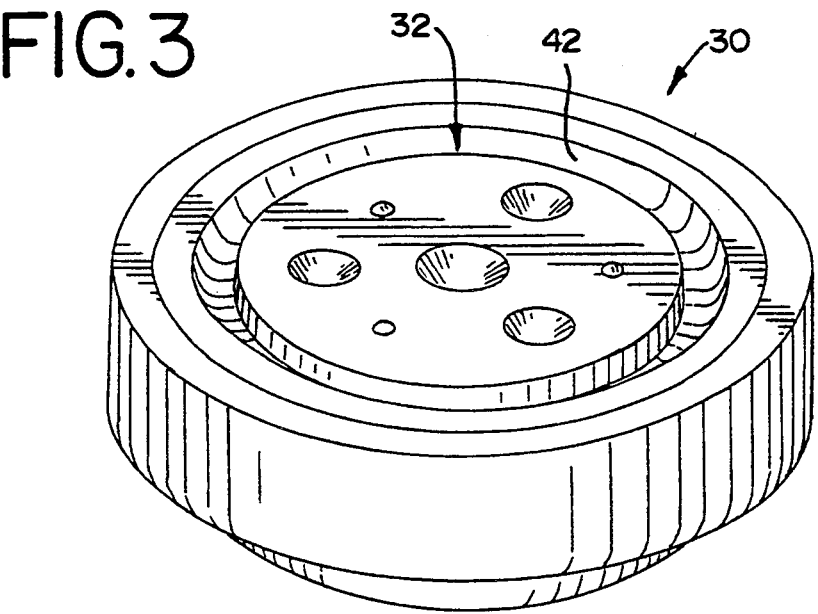
FIG. 3 is a perspective view of the top of the insert article.
Figure 4:
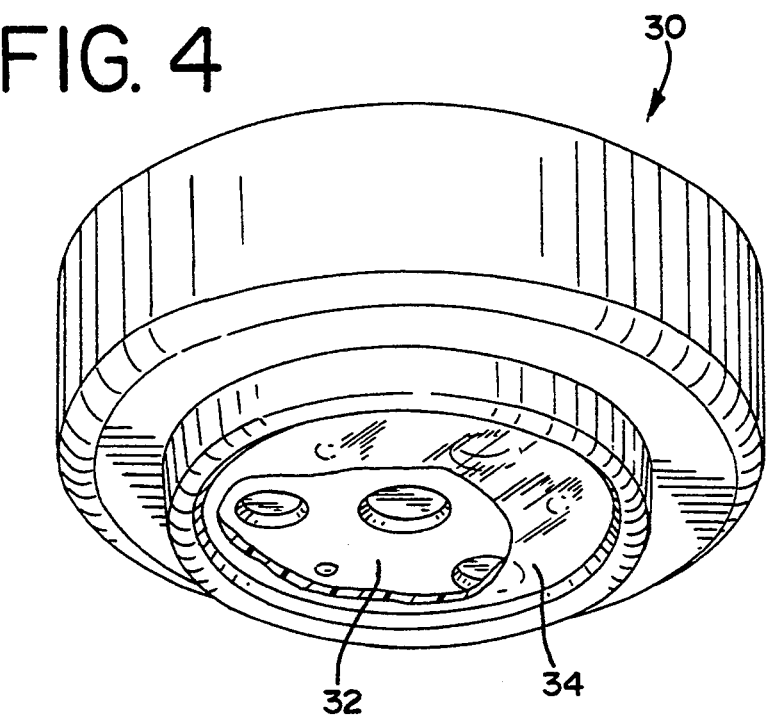
FIG. 4 is a perspective view of the bottom of the insert article with a portion of the insert article cut away to illustrate interior detail.

The container 22 includes an upper, inwardly extending flange 38 as illustrated in FIG. 1. The flange 38 extends over an outer, peripheral portion of the insert article 30 to retain the article 30 on the container 22. The retention capability can be further enhanced by embedding a portion 40 of the flange 38 in the insert article 30 as shown in FIG. 1. To this end, as illustrated in FIG. 3, the upwardly facing surface of the insert article rubber stopper 32 defines a circular groove 42 for receiving the container flange embedded portion 40 (FIG. 1). The stopper illustrated in FIG. 3 is not part of the present invention, however.

Although the package 20 can be manufactured by first molding the container 22 and subsequently, in other manufacturing processes, filling the container, loading the insert article, and molding the top of the container over the insert article, this is cumbersome and time consuming. The present invention provides an improved system for manufacturing such a package more effectively and more efficiently. The system of the present invention permits the employment of container forming techniques in a single apparatus that can form, fill, and appropriately seal the container in a substantially continuous operation.

The present apparatus is readily utilizable in conjunction with form-fill-seal mechanisms that are described in detail in U.S. Pat. No. 4,707,966 to Weiler et al. The disclosures of that patent are incorporated herein by reference thereto to the extent relevant and not inconsistent herewith. For convenience and ease of reference, the same reference numerals as used in said U.S. Pat. No. 4,707,966 to Weiler et al. are also employed herein to designate identical or analogous components and mechanisms.

Figure 5:
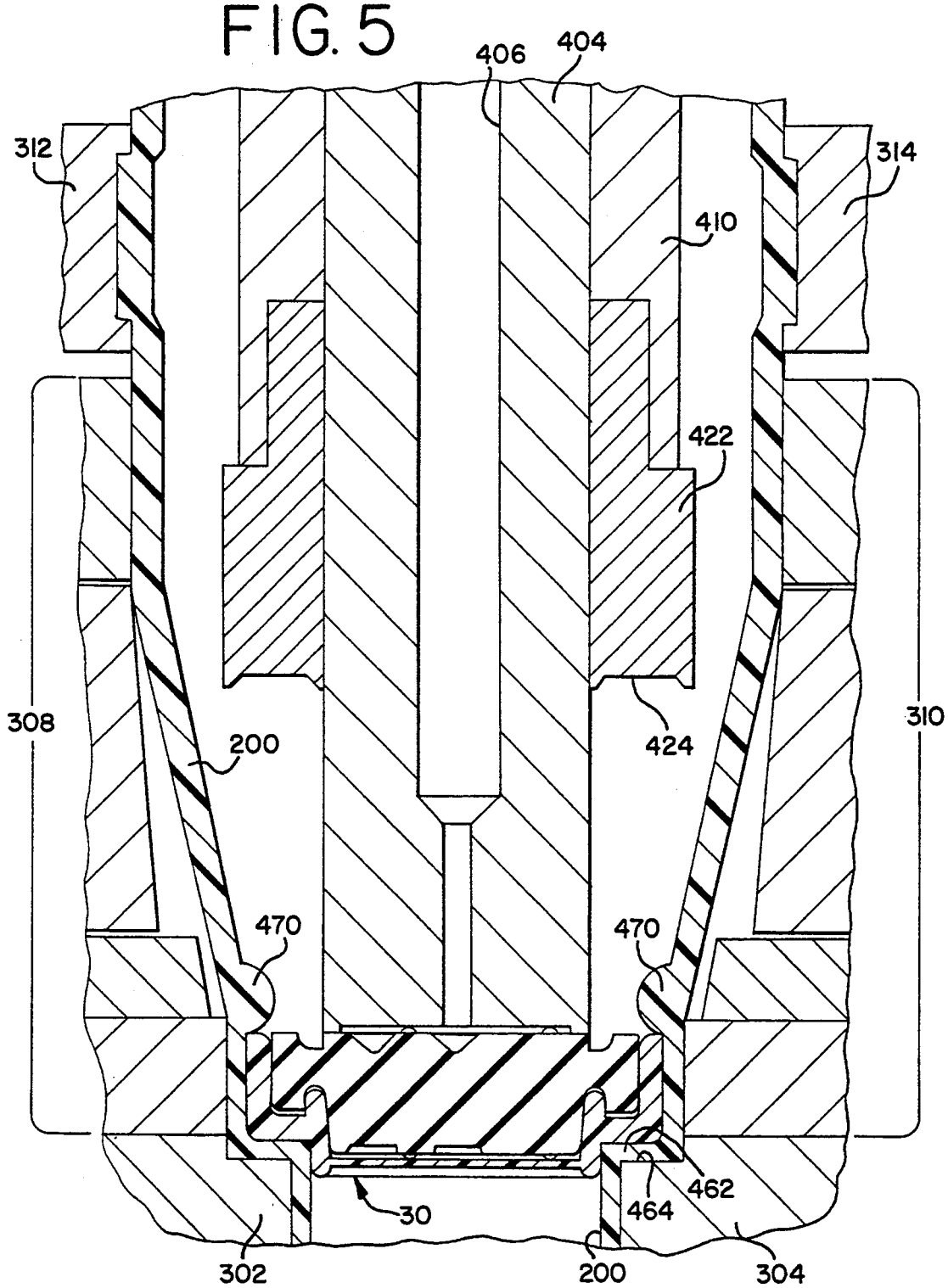
FIG. 5 is a more enlarged cross-sectional view showing a seal mold pressing radially against an insert article to form a bead of thermoplastic material.
Figure 6:
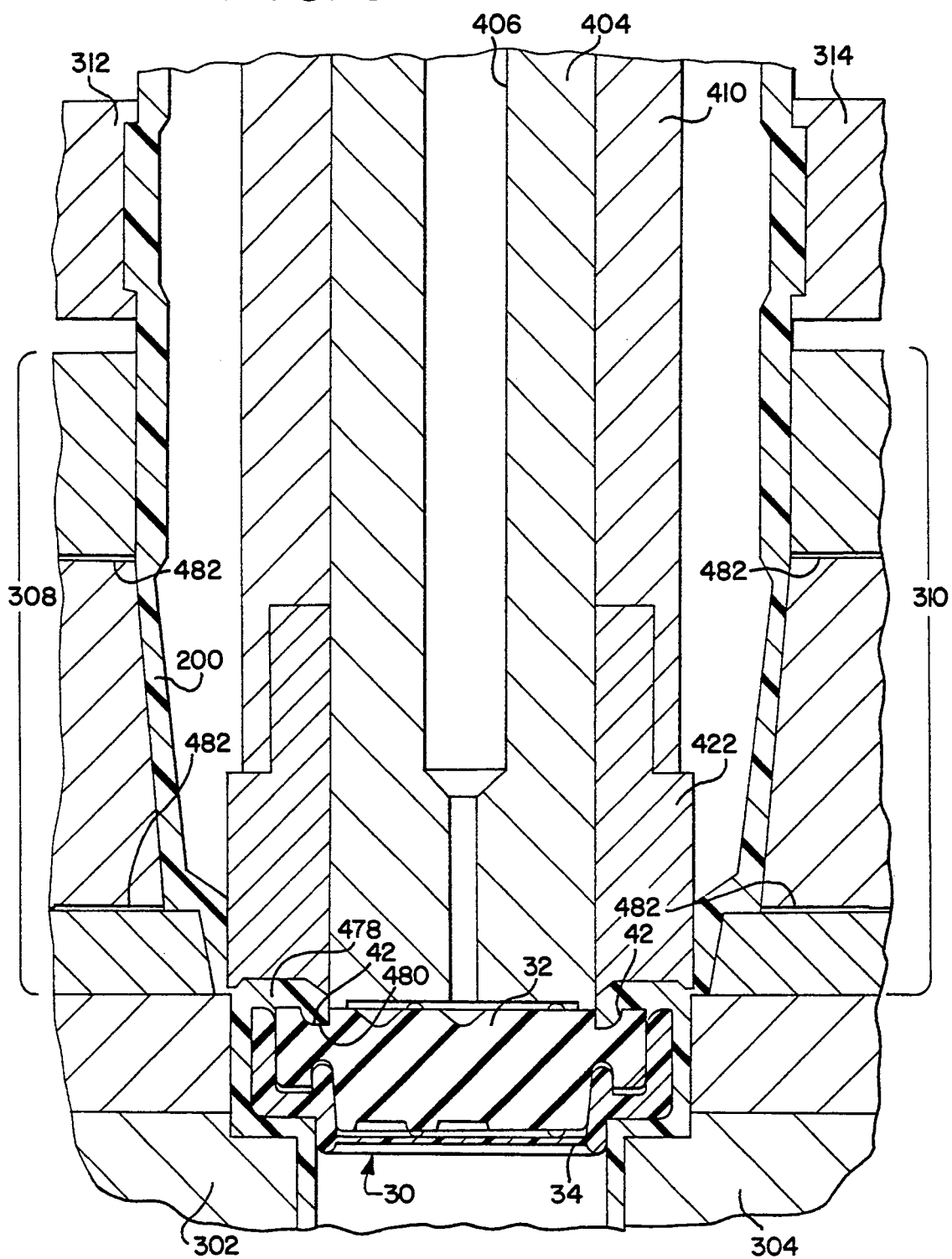
FIG. 6 is a view similar to FIG. 5, but showing a crimp ring or ram in a downwardly extended position while deforming the bead into a radially inwardly extending flange.

Seal molds 308 and 310 of a form-fill-seal mechanism, shown in FIG. 5, are movable inwardly to compress an extruded parison 200 against the article 30 and form a bead 470 that is contiguous with the insert article. As illustrated in FIG. 6, the ram or crimp ring 422 on insert pick-up tube 404 provided with vacuum passage 406 is next lowered by the actuator 410 to deform the bead 470 against the top of the insert article to form the flange 478 over the top of the article 30 to retain the article on the container.

The picking up of each insert article 30 and positioning thereof for sealing within the container parison is effected by appropriate movement of a suitable insertion assembly as known in the art.

Any suitable conventional system may be employed to reciprocate the mold assembly to position the insertion assemblies and blowing and filling mandrels associated therewith. The detailed designs of such systems form no part of the present invention.

After the container body portions are molded and filled in a known manner, the insert articles 30 are positioned in the openings of the container body portions as shown in FIG. 5. The preferred procedures of the method of the present invention will next be described in detail with respect to securing the insert article in place in a unique manner that can provide a substantially leak-tight seal and that resists pull-out or other dislodging forces.

When the insert article 30 is initially placed on the shoulder 462 of the parison 200, the parison is slightly spaced from the exterior, peripheral side surface of the insert article. This defines a clearance to accommodate the initial insertion of the article 30.

Subsequently, when the seal molds 308 and 310 of the mold assembly are moved inwardly (FIG. 5), the parison is compressed against the peripheral, vertical, side surface of the article 30. The parison is compressed radially inwardly against the insert article 30 so as to form the bead 470 which is pushed up over the top edge of the article 30 and surrounds it. Typically, the bead of parison material is contiguous with the insert article.

Next, an insertion assembly actuator 410 is operated to lower the plunger or crimp ring 422 against the bead 470. As illustrated in FIG. 6, this operation permanently deforms the bead against the top of the insert article to form the flange 478, similar to flange 38 in FIG. 1, over the top of the article 30 to retain the article on the container. In the preferred form of the method, the crimp ring or ram 422 deforms the bead against the insert article axially, in the general direction of the container body portion. At the same time a portion of the flange 478 is embedded in the peripheral groove 42 in the top surface of the insert article stopper 32. The molded embedment of the flange portion 480 in the stopper groove 42 provides a relatively stronger retention structure which even more effectively resists forces that might otherwise tend to dislodge the stopper 32 and/or its associated cup 34.

The compression of the parison bead 470 with the crimp ring 422 against an inserted stopper or the like is highly effective in forming a retention flange or rim unitary with the container body. The retention flange can be formed with a desired thickness in a consistent manner. This is in contrast with prior unsuccessful attempts to form an effective retaining rim over the article 30 by merely pushing softened container body material radially inwardly over the top of the article with portions of a seal mold assembly or in a secondary operation. Such attempts do not provide a uniform rim of sufficient thickness to withstand the typical pull-out forces.

After the crimp ring 422 has been moved down to form the flange 478, a partial vacuum is drawn in portions of the seal mold halves 308 and 310. To this end, a reduced pressure applied through ports 482 (FIG. 6) draws the parison 200 further radially outwardly and against the seal mold halves 308 and 310. The mold apparatus maintains the components in the orientation shown in FIG. 6 for a short "dwell" period to permit some cooling of the thermoplastic material.

Figure 7:
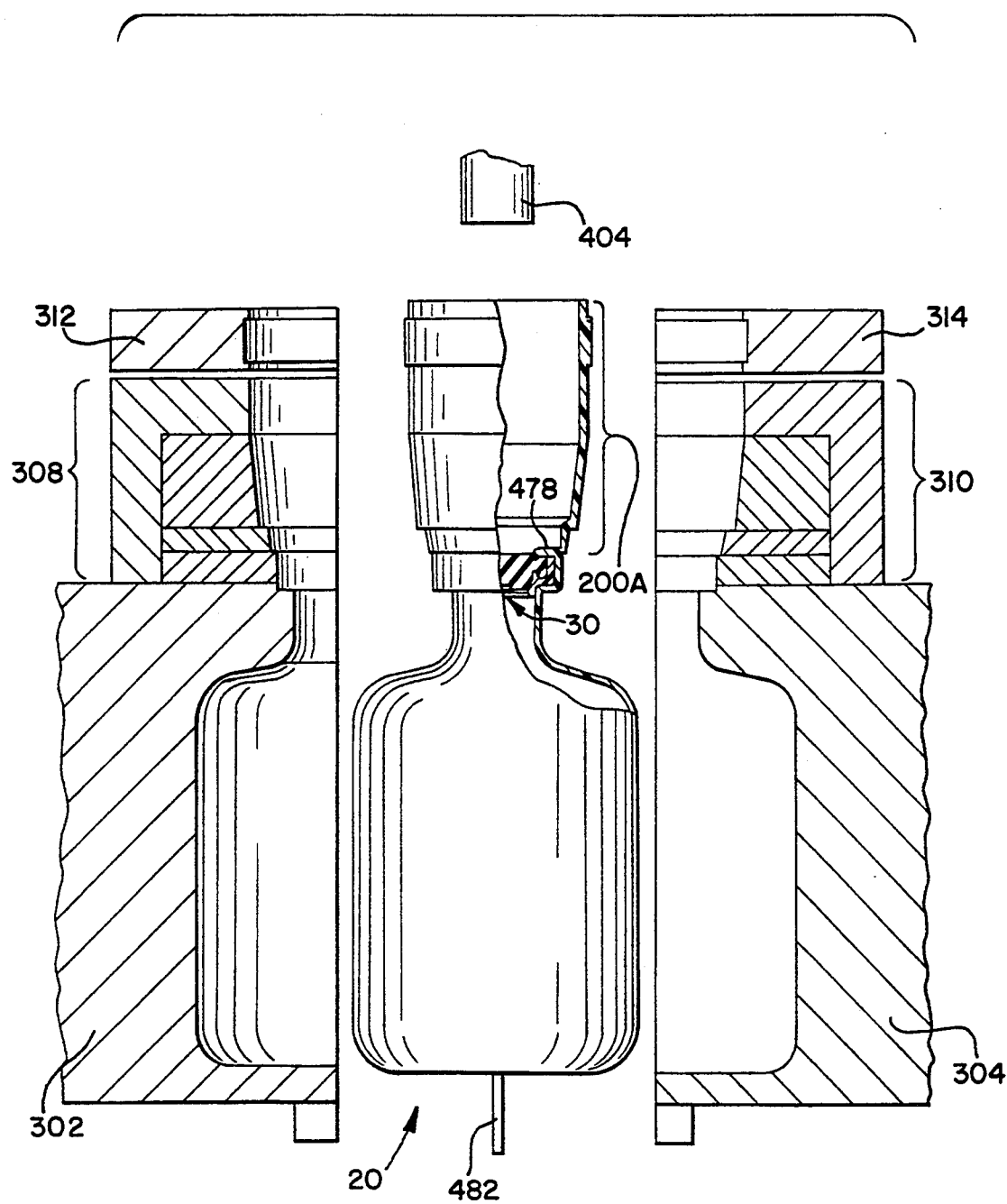
FIG. 7 is a view showing open and retracted mold positions to release a molded package sealed while practicing the present invention.

After the flanges such as flange 478 have been formed over the insert articles 30, the insert assembly actuators are operated to raise each crimp ring 422 to a retracted position, substantially to the position of the crimp ring 422 shown in FIG. 5. At this time, the mold assembly is opened (FIG. 7). This permits the formed, filled, and sealed packages 20 to be removed and/or conveyed out of the mold assembly by suitable conventional apparatus.

Preferably, the lower, main mold halves 302 and 304 are opened first. The seal mold halves 308 and 310 are subsequently opened along with the vacuum grippers 312 and 314. As the seal mold halves and grippers are opened, the partial vacuum drawn in those mold assembly components is terminated.

As illustrated in FIG. 7, an upper portion 200A of the parison extends from the upper, peripheral edge of the formed retention flange 478. This mold flash may be easily removed by conventional deflashing techniques. As can be seen in FIG. 6, the bottom of the extending flash is connected to the flange 478 by only a very thin ring of material. This ring is easily broken during conventional deflashing operations.

The package 20 is also initially formed with a downwardly projecting flash 482 as shown in FIG. 7. This flash can be similarly removed in conventional deflashing operations. Alternatively, the flash can be converted into a hanger, or the like, for package 20, if desired.

FIGS. 8 and 9 illustrate the fabrication of the package in a related but somewhat different manner. According to this form of the method, the lower, main mold halves 302A and 304A do not have a shallow recess in the upper surface for receiving the insert article 30. Rather, the main mold halves 302A and 304A have a flat upper surface 464A against which the parison is urged by a blowing and filling mandrel during the blowing and filling of the container body portion.

The lower portions of the seal mold halves 308A and 310A define a shoulder or recess 488A against which the parison is positioned when the insert article 30 is lowered into the seal mold halves by the insertion assembly pick-up tube 404. Initially, the seal mold halves 308A and 310A are spaced further than illustrated in FIG. 8 to provide a clearance around the vertical, peripheral, side surface of the insert article and accommodate initial placement of the article 30 within the seal mold halves. Subsequently, the seal mold halves 308A and 310A are moved closer together—to the position illustrated in FIG. 8. This compresses the parison radially inwardly against the insert article 30 to form a bead 470 of the thermoplastic material from the parison contiguous with the insert article. As illustrated, the bead 470 is preferably formed against the top edge of the article 30.

Subsequently, the insertion assembly actuator is operated to lower the crimp ring 422 against the bead 470 (FIG. 9). This permanently deforms the bead against the insert article 30 to form the flange 478 over a portion of the article 30. After an appropriate dwell period for cooling, the crimp ring 422 is retracted upwardly, the main mold halves 302A and 304A are opened, and the seal mold halves 308A and 310A are opened along with the parison grippers 312 and 314 as partial vacuum is terminated.

Thus, the package made by the form of the method and apparatus illustrated in FIGS. 8 and 9 is very similar to the package described heretofore. However, in the alternate form of the method and apparatus illustrated in FIGS. 8 and 9, the insert article 30 is sealed entirely within the upper, seal mold halves into the neck portion of the produced container.

The various forms of the method and apparatus of the present invention have been described in relation to the installation of a composite, insert article 30 comprising a rubber stopper 32 and a thermoplastic cup 34. It will be appreciated, however, that other forms of insert articles may be installed in a package according to the teachings of the present invention.

For example, a stopper, such as the stopper 32, may be installed in the package without a receiving cup 34. However, the use of a receiving cup 34 in conjunction with a rubber stopper can provide a higher strength retention structure in some cases, and isolates the stopper from the container contents. In particular, depending upon the materials and process temperatures employed, the thermoplastic material of the receiving cup 34 can be at least partially fused or otherwise united with the parison defining the container opening. Upon cooling, a substantially merged or unitary structure is formed from the cup and container upper wall. If desired, the outer peripheral surfaces of the receiving cup can be provided with ribs, fins, grooves, or the like, to further enhance sealing.

In addition, the sealing of the insert article to the container can be enhanced with other techniques, such as ultrasonic heating.

After the formed, filled and sealed package has been deflashed, an adhesive-backed, foil seal can be applied to the outwardly facing surface of the retention flange 478, if desired, to completely cover the exterior surface of the insert article 30 with a protective covering.

It will be readily apparent from the foregoing detailed description of the invention and from the illustrations thereof that numerous variations and modifications may be effected without departing from the true spirit and scope of the novel concepts or principles of this invention.

We claim:

1. A method for forming a package comprising the steps:
    molding a parison of a thermoplastic material to form a container body portion while maintaining an access opening thereto;
    filling said container body portion with a product;
    positioning an insert article within said access opening;
    compressing said parison radially inwardly against said insert article to form a bead of said thermoplastic material about said insert article; and
    permanently deforming said bead against said insert article so as to form a flange over a portion of said article to retain said article on said container.

2. The method in accordance with claim 1 in which said step of compressing said parison includes squeezing said parison with mold parts radially inwardly against a side of said insert article.

3. The method in accordance with claim 1 in which said step of permanently deforming said bead includes compressing said bead axially downwardly against a portion of the top of said insert article.

4. The method in accordance with claim 1 in which said step of permanently deforming said bead to form said flange includes imbedding a portion of said flange in a recess defined by said insert article.

5. The method in accordance with claim 1 in which said step of compressing said parison is carried out to form said bead contiguous with a top edge of said insert article.

6. A method for forming a package comprising the steps:
    molding a hollow segment of a thermoplastic parison to form a container body portion between closed lower mold parts while maintaining an opening in the remaining length of parison between upper mold parts situated above the closed mold parts;
    filling said container body portion with a product;
    positioning an insert article within said parison above said container body portion;
    closing the upper mold parts to squeeze said parison radially inwardly against said insert article to form a bead of thermoplastic material about the top of said insert article side; and
    forcing a plunger axially downwardly against said bead on the top of said insert article to form a flange over the top of said insert article to seal the container and retain said insert article on said container.

7. An apparatus for forming a package comprising:
    molding means for forming a parison of a thermoplastic material into a container body portion while maintaining an access opening thereto;
    positioning means for locating an insert article within said access opening;
    radial pressing means for compressing said parison radially inwardly against said insert article to form a bead of said thermoplastic material contiguous with said insert article; and
    axial pressing means for permanently deforming said bead against said insert article axially in the direction of the container body portion so as to form a flange over a portion of said insert article to retain said insert article on said container.

8. An apparatus for forming a package comprising:
    molding means for forming a parison of a thermoplastic material into a container body portion while maintaining an access opening thereto;
    positioning means for locating insert article within said access opening;
    radial pressing means for compressing said parison against a side of said insert article to form a bead of said thermoplastic material over the top edge of said insert article side; and
    axial pressing means for permanently deforming said bead against the top of said insert article to form a flange over the top of said insert article to retain said insert article on said container.

9. The apparatus in accordance with claim 8 in which said radial pressing means includes upper mold parts for squeezing said parison radially inwardly against a side of said insert article.

10. The apparatus in accordance with claim 8 in which said axial pressing means includes a ram configured as a hollow sleeve for pressing said bead axially downwardly against a portion of the top of said insert article.

11. The apparatus in accordance with claim 10 in which
   said sleeve is provided with an annular end wall for engaging said bead; and
   said end wall defines a circumferential channel therein.

* * * * *